United States Patent
Gauffin et al.

(10) Patent No.: US 11,465,055 B2
(45) Date of Patent: Oct. 11, 2022

(54) SYSTEMS AND METHODS FOR DETECTING AND PREVENTING FRAUDULENT IN-APP ACTIVITIES

(71) Applicant: Huuuge Global Ltd., Larnaca (CY)

(72) Inventors: Anton Gauffin, Berlin (DE); Wojciech Wronowski, Szczecin (PL)

(73) Assignee: Huuuge Global Ltd., Larnaca (CY)

( * ) Notice: Subject to any disclaimer, the term of this patent is extended or adjusted under 35 U.S.C. 154(b) by 0 days.

(21) Appl. No.: 17/019,551

(22) Filed: Sep. 14, 2020

(65) Prior Publication Data

US 2020/0406147 A1 Dec. 31, 2020

Related U.S. Application Data

(63) Continuation-in-part of application No. 16/263,628, filed on Jan. 31, 2019, now abandoned, which is a continuation of application No. 15/953,793, filed on Apr. 16, 2018, now Pat. No. 10,207,189.

(51) Int. Cl.
| | |
|---|---|
| A63F 13/75 | (2014.01) |
| A63F 13/537 | (2014.01) |
| G07F 17/32 | (2006.01) |
| A63F 13/79 | (2014.01) |
| A63F 13/35 | (2014.01) |

(52) U.S. Cl.
CPC .............. *A63F 13/75* (2014.09); *A63F 13/35* (2014.09); *A63F 13/537* (2014.09); *A63F 13/79* (2014.09); *G07F 17/3241* (2013.01)

(58) Field of Classification Search
CPC ........ A63F 13/75; A63F 13/537; A63F 13/79; A63F 13/35; G07F 17/3241
USPC ............................................................ 463/29
See application file for complete search history.

(56) References Cited

U.S. PATENT DOCUMENTS

| | | | | |
|---|---|---|---|---|
| 7,577,847 B2 * | 8/2009 | Nguyen | ............... | G07F 17/3206 713/186 |
| 8,360,838 B2 * | 1/2013 | Nguyen | ................. | G07F 17/32 463/9 |
| 9,619,965 B1 * | 4/2017 | Hill | ...................... | G07F 17/3209 |
| 10,105,608 B1 * | 10/2018 | George | ..................... | A63F 13/86 |
| 10,319,182 B2 * | 6/2019 | Wang | ....................... | A63F 13/33 |
| 10,521,249 B1 * | 12/2019 | Newcomb | ............... | G06F 9/451 |
| 2009/0176566 A1 * | 7/2009 | Kelly | .................. | G06Q 20/4014 463/29 |
| 2013/0225282 A1 * | 8/2013 | Williams | ............... | A63F 13/216 463/29 |
| 2017/0201521 A1 * | 7/2017 | Bruno | .................... | H04L 63/107 |

(Continued)

*Primary Examiner* — Michael A Cuff
(74) *Attorney, Agent, or Firm* — Ziegler IP Law Group, LLC

(57) ABSTRACT

A system for detecting and preventing fraudulent activities on a software application. The system includes a server arrangement that is communicably coupled with a user device. The server arrangement is configured to receive user-interaction data and sensor data from the user device on which the software application is being executed. The user-interaction data is indicative of an interaction of a user with the software application. The sensor data is collected by at least one sensor of the user device during execution of the software application. The server arrangement is further configured to analyse the user-interaction data and the sensor data to detect whether or not the user is a bot, and perform at least one action when the user is a bot.

21 Claims, 2 Drawing Sheets

(56) References Cited

U.S. PATENT DOCUMENTS

| | | | |
|---|---|---|---|
| 2017/0274831 A1* | 9/2017 | Onuki | B60L 53/14 |
| 2017/0294075 A1* | 10/2017 | Frenkel | G07F 17/3239 |
| 2018/0108015 A1* | 4/2018 | Rogas | H04L 61/2503 |
| 2018/0247312 A1* | 8/2018 | Loganathan | G06Q 20/4014 |
| 2019/0102790 A1* | 4/2019 | Martino | G06Q 30/0248 |
| 2019/0151761 A1* | 5/2019 | Krietzman | H04L 63/0861 |
| 2019/0155625 A1* | 5/2019 | Lu | G06F 3/0485 |

* cited by examiner

SYSTEMS AND METHODS FOR DETECTING AND PREVENTING FRAUDULENT IN-APP ACTIVITIES

CROSS-REFERENCE TO RELATED APPLICATIONS

This application is a continuation-in-part of U.S. patent application Ser. No. 16/263,628, entitled "SYSTEM AND METHOD FOR DETERMINING TYPE OF PLAYER IN ONLINE GAME" filed on 31 Jan. 2020, which is a continuation of U.S. patent application Ser. No. 15/953,793, entitled "SYSTEM AND METHOD FOR DETERMINING TYPE OF PLAYER IN ONLINE GAME", filed on 16 Apr. 2018, the disclosures of which are incorporated herein by reference in their entireties.

TECHNICAL FIELD

The present disclosure relates to a system and a method for detecting and preventing fraudulent activities on a software application. The present disclosure also relates to a computer program product for detecting and preventing fraudulent activities on the software application.

BACKGROUND

The growth in popularity and complexity of multiplayer online games has been accompanied by an increase in the problem of cheating. As an example, some players use autonomous programs (such as, bots) that can interact with the online game. Such autonomous programs are designed to run automated tasks on behalf of the human player in the online game and can apply perfect or near-perfect strategies to tilt the outcome of gameplay in their favour to attain recognition and/or some form of monetary gain. This discourages honest players from playing the online game and from making any monetary transactions with a gaming service provider of the online game.

Similarly, bots are becoming an increasingly important issue in other fields, for example, such as e-commerce, in-app advertising, online banking and the like.

Existing techniques to overcome the aforesaid problems incorporate security measures, for example, such as CAPTCHA, intended to distinguish human players from bots. However, contemporary security measures are inefficient.

Therefore, in light of the foregoing discussion, there exists a need to overcome the aforementioned drawbacks associated with detecting and preventing fraudulent activities on software applications.

SUMMARY

The present disclosure seeks to provide a system and a method for detecting and preventing fraudulent activities on a software application. The present disclosure also seeks to provide a computer program product for detecting and preventing fraudulent activities on the software application. The present disclosure seeks to provide a solution to the existing problem of fraudulence in-app activities. An aim of the present disclosure is to provide a solution that overcomes at least partially the problems encountered in prior-art, and provides a system, method and computer program product for detecting and preventing fraudulent activities on a software application in a reliable and non-circumventable manner.

In an aspect, an embodiment of the present disclosure provides a system for detecting and preventing fraudulent activities on a software application, the system comprising a server arrangement that is communicably coupled with a user device, wherein the server arrangement is configured to:
receive user-interaction data and sensor data from the user device on which the software application is being executed, the user-interaction data being indicative of an interaction of a user with the software application, the sensor data being collected by at least one sensor of the user device during execution of the software application;
analyse the user-interaction data and the sensor data to detect whether or not the user is a bot; and
perform at least one action when the user is a bot.

In another aspect, an embodiment of the present disclosure provides a method for detecting and preventing fraudulent activities on a software application, the method comprising:
receiving user-interaction data and sensor data from a user device on which the software application is being executed, the user-interaction data being indicative of an interaction of a user with the software application, the sensor data being collected by at least one sensor of the user device during execution of the software application;
analysing the user-interaction data and the sensor data to detect whether or not the user is a bot; and
performing at least one action when the user is a bot.

In yet another aspect, an embodiment of the present disclosure provides a computer program product for detecting and preventing fraudulent activities on a software application, the computer program product comprising a non-transitory machine-readable data storage medium having stored thereon program instructions that, when accessed by a processing device, cause the processing device to:
collect user-interaction data indicative of an interaction of a user with the software application, the software application being executed on the processing device;
collect sensor data generated by at least one sensor of the processing device during execution of the software application;
send the user-interaction data and the sensor data to a server arrangement, wherein the server arrangement is configured to analyse the user-interaction data and the sensor data to detect whether or not the user is a bot;
receive an indication from the server arrangement when the user is a bot; and
perform at least one action upon receiving the indication.

Embodiments of the present disclosure substantially eliminate or at least partially address the aforementioned problems in the prior-art, and enable detection and prevention of fraudulent activities on the software application in a reliable and secure manner.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

Figure 1:
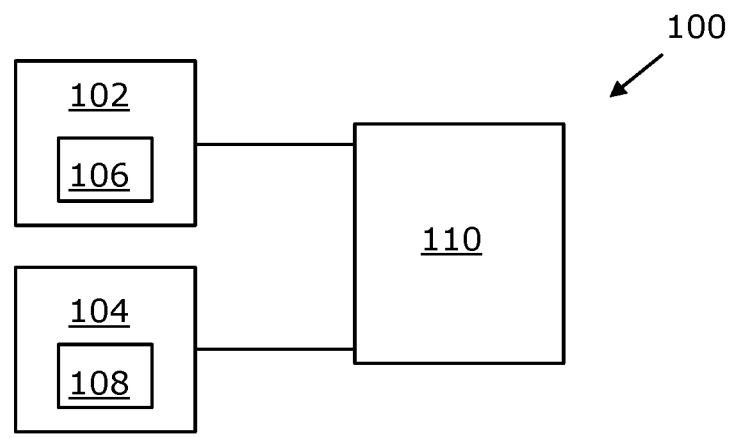
FIG. 1 illustrates a network environment in which a system for detecting and preventing fraudulent activities in a software application can be implemented, pursuant to embodiments of the present disclosure.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

In an aspect, an embodiment of the present disclosure provides a system for detecting and preventing fraudulent activities on a software application, the system comprising a server arrangement that is communicably coupled with a user device, wherein the server arrangement is configured to:
receive user-interaction data and sensor data from the user device on which the software application is being executed, the user-interaction data being indicative of an interaction of a user with the software application, the sensor data being collected by at least one sensor of the user device during execution of the software application;
analyse the user-interaction data and the sensor data to detect whether or not the user is a bot; and
perform at least one action when the user is a bot.

In another aspect, an embodiment of the present disclosure provides a method for detecting and preventing fraudulent activities on a software application, the method comprising:
receiving user-interaction data and sensor data from a user device on which the software application is being executed, the user-interaction data being indicative of an interaction of a user with the software application, the sensor data being collected by at least one sensor of the user device during execution of the software application;
analysing the user-interaction data and the sensor data to detect whether or not the user is a bot; and
performing at least one action when the user is a bot.

In yet another aspect, an embodiment of the present disclosure provides a computer program product for detecting and preventing fraudulent activities on a software application, the computer program product comprising a non-transitory machine-readable data storage medium having stored thereon program instructions that, when accessed by a processing device, cause the processing device to:
collect user-interaction data indicative of an interaction of a user with the software application, the software application being executed on the processing device;
collect sensor data generated by at least one sensor of the processing device during execution of the software application;
send the user-interaction data and the sensor data to a server arrangement, wherein the server arrangement is configured to analyse the user-interaction data and the sensor data to detect whether or not the user is a bot;
receive an indication from the server arrangement when the user is a bot; and
perform at least one action upon receiving the indication.

The aforementioned aspects allow for a user type to be determined while the software application is in use. This can prevent a substitution of a human user with a bot at a later point during the execution of the software application. Moreover, the user-interaction data and the sensor data are sent from the user device to the server arrangement, without any disruption to the user using the software application. Thus, these aspects advantageously provide a user-friendly and efficient way of detecting and preventing in-app frauds.

It will be appreciated that fraudulent activities may occur on a variety of software applications, for example, such as online games, e-commerce applications, in-app advertisements, online finance applications, online wagering portals, and the like. Such fraudulent activities generally involve the use of bots for mimicking human actions to gain undue advantage. In particular, the use of bots has been quite prevalent in online games. Herein, online games refer to a structured form of play that is either partially or primarily played over a communication network. The online game can be played by a single player or multiple players. The examples of the online game include, but are not limited to, a wager-based game (such as a game of chance, a slot machine or any other betting game), a castle game, and a strategy-based game (e.g., a city building game).

The aforementioned aspects can advantageously determine when a software application is being used by a bot rather than a human user. This limits abuse of the software application by ensuring that only human users are using the software application. As an example, in case of an online game, this ensures that only human players are playing against each other and that bots are not taking over the game and competition. This advantageously levels the playing field, particularly when it is difficult to visualize or necessarily know who the other opponent or opponents are in the online game. It will be appreciated that although herein, the present disclosure has been described primarily in terms of the software application being an online game, the embodiments of the present disclosure are also applicable to other types of software applications (such as e-commerce applications, in-app advertisements, online finance applications, online wagering portals and the like) without any limitations.

Optionally, the server arrangement is configured to store data related to the software application. Continuing from the previous example of the online game, the server arrangement may store information about a number of users, winners and rewards awarded to the winners in a database associated therewith.

Further, the term "user device" relates to an electronic computing device on which the software application is executing. Continuing from the previous example of the online game, the user is a player playing the online game and the user device is a player device on which the player plays the online game. Examples of the user device include, but are not limited to, a personal computer, a hand-held computing device, a tablet, a game console, a laptop, a mobile computer, a wearable computer, a communication device such as a cell phone, a personal digital assistant, a video slot machine, a video poker machine, a kiosk, a casino personal device, and the like. The user device may include a display for displaying data related to the software application to the user and a user interface to receive inputs related to the interaction of the user with the software application.

The server arrangement is communicably coupled with the user device through a communication network. The communication network may be a wired network, a wireless network, or any combination thereof. Examples of the communication network include, but are not limited to, Local Area Networks (LANs), Wide Area Networks (WANs), Internet, radio networks and telecommunication networks. In an online game, multiple user devices operated by respective users are connected to at least one server of the server arrangement through the communication network.

Optionally, the server arrangement is configured to transmit at least one data element to the user device during the execution of the software application on the user device, wherein the user-interaction data is generated based on a response of the user to the at least one data element being rendered at the user device during the execution of the software application. Throughout the present disclosure, the term "data element" relates to data content provided to the user device. The data element optionally pertains to the online game. In such a case, the user continues to play without getting distracted by unrelated questions, etc. Alternatively, the data element could be generic, namely, unrelated to the software application.

Throughout the present disclosure, the term "user-interaction data" relates to data content associated with the interaction of the user with the data element and the user device. Continuing from the previous example of the online game, the data element could include game-related data content (for example, such as game instructions, levels, scores, characters/objects, animations, etc.). The data element may be in the form of text, image(s), video, audio or any combination thereof. The data element includes information (for example, such as one or more questions, a set of rules, game levels and the like) with which the user interacts.

Upon receiving the data element, the user device renders the data element on the display therein. The user interacts with the rendered data element using the user interface of the user device. Examples of the user interface include, but are not limited to, a touch-sensitive input, a mouse, a keyboard, a joystick, a gesture controller, a display (for example, flat panel display, liquid crystal display, light-emitting diode and the like). For example, if the user interface of the user device is a touch-sensitive surface, the user interacts with the software application by tactile input by using fingers or a stylus. In another example, if the user interface is a gesture-based interface, the user interacts with the software application through hovering the hand and/or other body parts. Such interaction of the user (user-interaction) with the software application is transmitted as the user-interaction data to the server arrangement.

In an example, if the software application is a quiz game providing a question along with four options, and the user may respond to the question by selecting one of the four options; in such a case, such question may be considered as the data element and such selection may be considered as the user-interaction. In another example, if the software application is a car race game providing a race track with some challenges and involves the user to control acceleration, deceleration, direction etc. of the car to overcome those challenges; in such an example, such race track may be considered as the data element and the control by the user may be considered as the user-interaction. Other exemplary data elements and corresponding user-interactions includes, but are not limited to, providing the option for and selecting: a game level, a background theme, audio settings, and the like.

Furthermore, throughout the present disclosure, the term "sensor data" relates to data collected by the at least one sensor of the user device. The sensor data could be collected before, during or after the interaction of the user with the software application. The at least one sensor could be a physical sensor or a virtual sensor. Optionally, the at least one sensor comprises at least one of: an accelerometer, a gyroscope, an imaging sensor, a location sensor, a temperature sensor, a proximity sensor, a touch-pressure sensor, a fingerprint sensor. Accordingly, optionally, the sensor data is indicative of at least one of: an acceleration of the user device, an orientation of the user device, an image of the user, an image of surroundings of the user device, a location of the user device, an ambient temperature in surroundings of the user device, a proximity of the user to the user device, a touch pressure applied by the user, a fingerprint of the user. In general, for the purposes of the present disclosure, the at least one sensor and the corresponding sensor data are implemented to confirm that a human user is interacting with the user device while executing the software application therein.

Herein, the accelerometer could be employed to measure the proper acceleration of the user device and thereby determine the movement of the user device. Further, the gyroscope could be employed to measures the orientation of the user device. Continuing from the previous example, if the user device is a handheld gaming device, it will be appreciated that the user may interact with the user device to perform some actions involving a change in movement and/or orientation of the user device to control game characters or the like while executing the software application. Such movement and/or orientation information may be transmitted to and analysed by the server arrangement to confirm physical actions associated with the interaction of the user with the user device while executing the software application.

Herein, the imaging sensor could be employed to capture imagery information of the user and/or the surroundings. The imaging sensor may capture a video feed and/or still images. The images captured during the interaction of the user with the software application (namely, when the user-interaction data is being generated) enable the server arrangement to detect the presence and physical appearance of the user with the user device while executing the software application.

Herein, the location sensor could be employed to detect the location of the user device. In an example, the location sensor may be a global positioning unit for detecting location coordinates of the user device. Further, if the user is executing the software application while travelling from one point to another, the global positioning unit may continuously detect the location of the user device to determine a movement pattern of the user. Such location information is transmitted to and analysed by the server arrangement, for instance by comparing with a determined location of the user device from an IP address thereof, to confirm if it is the actual user device or some remote computer implementing bot(s).

Herein, the temperature sensor could be employed to measure the ambient temperature in the surroundings of the user device. Specifically, the temperature sensor may measure the temperature of the physical component of the user device being held by the user. Further, the proximity sensor could be employed to measure the proximity of the user to the user device. Furthermore, the touch pressure sensor measures the amount of touch pressure applied by the user in order to interact with the user interface, such as, on the touch screen as a response to the data element rendered on the user interface. Furthermore, the fingerprint sensor could be employed to confirm the fingerprint of the user to verify the identity of the user. Such sensor data enables the server arrangement to confirm if a human user is holding the user device during the execution of the software application.

Furthermore, optionally, the user-interaction data is indicative of at least one of: a time elapsed between a time instant at which the at least one data element is rendered at the user device and a time instant at which the user provided the response, a time duration in which the response is provided, a velocity and/or acceleration with which the user moves a pointer on the display of the user device, a movement pattern of the pointer, a click pattern of the pointer, a pause pattern of the pointer, a number of pointer clicks made by the user to provide the response, areas on the display where the user made the pointer clicks, a key-press pattern of one or more keys of an input device associated with the user device, a latency between pressing a given key and pressing a next key, a latency between releasing the given key and releasing the next key, a latency between releasing the given key and pressing the next key, a time duration in which pressure is applied on a given key. Thus, the user-interaction data is indicative of physical attributes of the interaction of the user with the user device during the execution of the software application. It will be appreciated that these physical attributes differ from user to user and thus, can be used to distinguish one user from the other.

Herein, the time elapsed between the time instant at which the at least one data element is rendered at the user device and the time instant at which the user provided the response represent a response time of the user. Such parameters may be determined using time-stamps. The time-stamps also enable the server arrangement to correlate the at least one data element and the user-interaction data, as well as the sensor data. For this purpose, a clock of a processor of the user device is employed to assign time-stamps to the time instant at which the data element is rendered at the user device and the time instant at which the user provided the response therefor. In an example, when the software application is an online shooting game where a ball needs to be shot by a gun when the ball is displayed on the display of the user device, the time taken by different players to press the trigger of the gun to shoot the ball is different. Some players have a better reflex and may press the trigger of the gun faster as compared to other players who may pause a bit and then aim a shot at the ball and hence may press the trigger of the gun later. Moreover, a human user typically needs a minimum amount of time to formulate a response and interact with the user device. However, a machine or bot can respond much more quickly. Thus, the response time can be used to distinguish one user from the other and a human user from a bot.

Herein, the velocity and/or the acceleration with which the user moves the pointer on the display of the user device represent attributes of the physical action as part of the interaction of the user with the user device. For example, in an online shooting game where a ball needs to be shot by a gun, when the ball is rendered on the display of the user device, the player needs to point the pointer of the gun at the ball. Such attributes differ from user to user. Thus, the velocity and/or the acceleration with which the pointer is moved can be used to distinguish one user from the other.

Herein, the movement pattern, the click pattern and the pause pattern of the pointer represent inherent patterns of the user. It may be understood that such patterns of the pointer may differ from user to user. For example, in an online shooting game of shooting the ball, different users may follow different paths in order to point the pointer on the ball. Further, the ball may be shot at a number of times. Some players may shoot the ball once at the centre while others may shoot closer to a circumference of the ball multiple times repeatedly with different click rates. Furthermore, when the ball appears, some players may be able to accurately pause the movement of the pointer on the ball, others may overshoot the position of the ball and move the pointer back to point at the ball, and still others may first stop just before the rendered position of the ball and then slowly move towards the position of the ball. Thus, such inherent patterns of the user can be used to distinguish one user from the other.

Herein, the number of pointer clicks made by the user to provide the response, the areas on the display where the user made the pointer clicks and the key-press pattern of one or more keys of the input device associated with the user device represent inherent responses of the user. It may be understood that such inherent responses of the user differ from user to user. As an example, in an online shooting game where avatars need to be shot to provide the response, and where the avatar is killed instantaneously when shot in the head and require a certain number of shots to be fired in order to kill the avatar when shot at other points of the avatar's body, different players may need different number of pointer clicks to kill the avatar. As another example, in an online shooting game of shooting the ball with a circular boundary, some players may shoot at a lower portion of the circular boundary while others may shoot at an upper portion thereof. It may be appreciated that a given data element can only trigger up to a predefined number of clicks, typically at predefined areas on the display. A human player can be distinguished from a bot based on whether or not the number of pointer clicks is less than the predefined number. As yet another example, in a video game where the players have to protect a digital character from bullets, some players may use keyboard to press a key configured to make the digital character to duck while others may use the keyboard to press a key configured to make the digital character to jump in order to avoid the bullet. Thus, such inherent responses of the user can be used to distinguish one user from the other.

Herein, the latency between pressing the given key and pressing the next key, the latency between releasing the given key and releasing the next key, the latency between releasing the given key and pressing the next key, and the time duration in which pressure is applied on the given key represent inherent reflex/response times of the user. It may be understood that each of these parameters representing inherent reflex/response times may differ from user to user. Consider an example of a video game where the players have to protect a digital character from bullets while moving forward by pressing (applying pressure on) a first key configured to make the digital character to duck for a certain amount of time till the bullet is passed to avoid the bullet and subsequently releasing the first key and pressing (applying pressure on) a second key configured to make the digital character move forward and thereafter releasing the second key. Some players may wait a certain amount of time after pressing the first key even when the bullet has passed before releasing it and then press the second key; while others may immediately release the first key and press the second key afterwards the bullet has crossed. Thus, it may be contemplated that such inherent reflex/response times of the user can be used to distinguish one user from the other.

Furthermore, optionally, when analysing the user-interaction data and the sensor data to detect whether or not the user is a bot, the server arrangement is configured to:

calculate a reliability factor for the user based on said analysis of the user-interaction data and the sensor data; and detect whether or not the user is a bot, based on the calculated reliability factor.

Throughout the present disclosure, the term "reliability factor" relates to a score assigned to the user. Herein, the reliability factor is an indicator or measure of reliability of the user. The reliability factor could represent a probability of the user being a human user. Higher the reliability factor, higher the probability of the user being the human user. Alternatively, the reliability factor may be a floating number or an integer.

In an exemplary implementation, the image of the user (as captured by the imaging sensor) is analysed to detect the physical appearance of the user. If the detected image of the user depicts a human appearance, a higher reliability factor may be provided to the user. In another exemplary implementation, a combination of the movement pattern, the click pattern and the pause pattern of the pointer is analysed to detect the inherent patterns of the user. It may be understood, if a similar pattern is detected for a longer duration of time, the server arrangement may determine that the type of the user is the bot, since the bot is designed to do a specific task and follows a specific pattern, and may thus provide a lower reliability factor in such case. This can be done since the same human player may have different interactions for same elements/conditions over a period of time in execution of the software application, whereas the bot is designed to do a specific task and follows a specific pattern.

Moreover, the server arrangement may analyse the user-interaction data and the sensor data by using a set of algorithms. Examples of such algorithms may include, but are not limited to, linear algorithms, logarithmic algorithms, fuzzy logic, artificial intelligence, machine learning mechanisms and the like.

Optionally, the server arrangement is configured to receive user-interaction data and the sensor data from a plurality of user devices on which the software application is being executed, wherein users interacting with the software application are humans; analyse the user-interaction data and the sensor data received from the plurality of user devices to determine a pattern of usage of the software application by the humans; and train a machine learning model based on the determined pattern of usage of the software application by the humans, wherein the trained machine learning model is to be employed to analyse the user-interaction data and the sensor data received from the user device to detect whether or not the user is a bot. That is, in order to train the machine learning model of the server arrangement, a pattern of usage of the software application by real humans is fed thereto.

The determined pattern of usage may provide a range and an average of possible values of the aforementioned physical attributes of interactions of the users with their corresponding user devices during the execution of the software application. For example, the pattern or usage may provide a range and an average of response times of the users, a range and an average of time durations in which responses are provided, a range and an average of velocities and/or accelerations with which the users move the pointers,; a range of the number of clicks made by the users to provide the responses, areas on the display where the users made the pointer clicks, etc. Further, the determined pattern may provide information about the movement pattern of the pointer, the click pattern of the pointer, the pause pattern of the pointer, the key-press pattern, etc. Furthermore, the determined pattern may provide information about patterns of images captured by image sensors, patterns of movements obtained from accelerometers and/or gyroscopes, etc.

Throughout the present disclosure, the term "bot" used herein relates to non-human users. The bots are artificial intelligence enabled instructions to use the software application. To detect whether or not the user is a bot, the server arrangement may compare the calculated reliability factor with a predetermined value. For example, the predetermined value may be chosen, such that if the calculated reliability factor is greater than or equal to the predetermined value, the user is determined to be human, whilst if the calculated reliability factor is less than the predetermined value, the user is determined to be the bot.

As mentioned earlier, when the user is determined to be the bot, at least one action is performed in order to prevent any fraudulent activity. Optionally, the least one action comprises at least one of: notifying an application vendor of the software application, disabling the software application on the user device, partially disabling the software application on the user device, interrupting the execution of the software application on the user device, removing the software application from the user device, isolating a user account of the user from user accounts of other users, blacklisting the user account, blacklisting the user device, recording a fraudulent activity conducted by the bot, recording information pertaining to the bot, recording information pertaining to a session of the software application in which a fraudulent activity is detected, deferring a transfer of credits made from or to the user account during the session of the software application, adjusting settings related to billing, disabling advertisements on the software application.

The action "notifying the application vender of the software application" may involve raising a flag to indicate the occurrence of the fraudulent in-app activity. The application vendor may then decide on what to do. As an example, temporary disablement may be performed to discontinue a particular session of the software application. When the software application on the user device is disabled, no data is transmitted or received to and from the user device. As an example, the sensor data and the user-interaction action may not be received from the server arrangement. Moreover, the at least one data element may not be sent to the user device. Some of the actions may be performed only temporarily, until the issue is determined to be resolved.

The action "disabling the software application on the user device" may involve disabling all the features of the software application and/or preventing the execution of the software application on the user device. The software application may be disabled immediately or at an end of a current session. The action "partially disabling the software application on the user device" may involve disabling certain features of the software application, for example, such as those related to credits. Herein, the credits may be in the form of points, a prize or a cashback. The partial disablement may, thus, help in preventing the fraudulent in-app activity in crucial areas of the software application.

The action "interrupting the execution of the software application on the user device" may involve issuing a warning or the like after certain intervals to interrupt the execution of the software application. For example, in an online game, if the user is determined to be the bot, the software application may be configured to issue warnings via pop-ups that may interrupt the gameplay, which needs to be checked in order to continue execution of the software application. The action "removing the software application from the user device" may involve uninstalling the software application from the user device. Thus, in order to execute the software application, the user would have to re-install it.

The action "isolating a user account of the user from user accounts of other users" may involve isolating the user account of the user determined to be the bot from the user accounts of the other users who are determined to be humans. The technical benefit of isolating the user account is that the bot executing on the user device would not know that it has been detected. Moreover, isolating the user account in the case of online games provides a level playing for the human players.

The action "blacklisting the user account" prevents the respective user account from joining any sessions of the software application in future. If multiple user accounts are present in a single user device, only the user account having determined to be implementing the bot may be blacklisted. The action "blacklisting the user device" blocks the user device and hence, all user accounts present in the user device from further execution of the software application. This may be achieved by blacklisting a MAC address or some other unique identifier of the user device.

The action "recording a fraudulent activity conducted by the bot" records information about the activity performed by the bot on the user device while executing the software application. The action "recording information pertaining to the bot" records information about a code employed by the bot or a version of the bot being implemented. The action "recording information pertaining to a session of the software application in which a fraudulent activity is detected" records information about the session of the software application, for example, such as time, date and duration of the session. Such recorded information may be stored in the database and may be further analysed to prevent occurrences of such fraudulent activities in future and also to help in detecting the bots faster in future.

The action "deferring a transfer of credits made from or to the user account during the session of the software application" may involve blocking and optionally reversing any credits utilization by the bot. As an example, credits earned during the ongoing session of the online game may be reversed. As another example, a financial transaction made using an e-commerce payment service application may be cancelled. This may demotivate the user implementing the bot from further carrying out such fraudulent activities. The action "adjusting settings related to billing" may involve preventing the user account from making financial transactions. That is, in case such user has stored banking details such as bank account information to receive credits from other users, the settings related to the billing may be disabled to prevent the bot from receiving such credits.

The action "disabling advertisements on the software application" may involve not showing any advertisements on the software application. For example, in online games, some players live stream their gameplay for viewers to watch and have an option of displaying advertisements and earning credits in their user account usually based on a number of views. In such cases, the action of disabling the advertisements would discourage the user from using the bot. In other examples, bots may be programmed to click on advertisements in the software application to earn credits, where such credits are provided by a vendor of the software application. Such sources for earning credits may thus be blocked by disabling advertisements on the software application.

Optionally, the server arrangement is configured to allow the user to continue using the software application when the user is not a bot. In an implementation, the user is awarded the credit points/prize/cashback in the user's account only upon confirmation that the user is the human player. An account-related data may be maintained in the database. The earned credits may be redeemed for a transaction performed at the point of sale or online shopping. Alternatively, the credits may be redeemed to play games when the software application is the online game.

Moreover, the present description also relates to the method for detecting and preventing fraudulent activities on the software application as described above. The various embodiments and variants disclosed above apply mutatis mutandis to the aforementioned method.

Optionally, in the method, the at least one action comprises at least one of: notifying an application vendor of the software application, disabling the software application on the user device, partially disabling the software application on the user device, interrupting the execution of the software application on the user device, removing the software application from the user device, isolating a user account of the user from user accounts of other users, blacklisting the user account, blacklisting the user device, recording a fraudulent activity conducted by the bot, recording information pertaining to the bot, recording information pertaining to a session of the software application in which a fraudulent activity is detected, deferring a transfer of credits made from or to the user account during the session of the software application, adjusting settings related to billing, disabling advertisements on the software application.

Optionally, the method further comprises:
  receiving user-interaction data and sensor data from a plurality of user devices on which the software application is being executed, wherein users interacting with the software application are humans;
  analysing the user-interaction data and the sensor data received from the plurality of user devices to determine a pattern of usage of the software application by the humans; and training a machine learning model based on the determined pattern of usage of the software application by the humans, wherein the trained machine learning model is employed to analyse the user-interaction data and the sensor data received from the user device to detect whether or not the user is a bot.

Optionally, the method further comprises transmitting at least one data element to the user device during the execution of the software application on the user device, wherein the user-interaction data is generated based on a response of the user to the at least one data element being rendered at the user device during the execution of the software application. Optionally, the user-interaction data is indicative of at least one of: a time elapsed between a time instant at which the at least one data element is rendered at the user device and a time instant at which the user provided the response, a time duration in which the response is provided, a velocity and/or acceleration with which the user moves a pointer on the display of the user device, a movement pattern of the pointer, a click pattern of the pointer, a pause pattern of the pointer, a number of pointer clicks made by the user to provide the response, areas on the display where the user made the pointer clicks, a key-press pattern of one or more keys of an input device associated with the user device, a latency between pressing a given key and pressing a next key, a latency between releasing the given key and releasing the next key, a latency between releasing the given key and pressing the next key, a time duration in which pressure is applied on a given key.

Optionally, the at least one sensor comprises at least one of: an accelerometer, a gyroscope, an imaging sensor, a location sensor, a temperature sensor, a proximity sensor, a touch-pressure sensor, a fingerprint sensor. Optionally, the sensor data is indicative of at least one of: an acceleration of the user device, an orientation of the user device, an image of the user, an image of surroundings of the user device, a location of the user device, an ambient temperature in surroundings of the user device, a proximity of the user to the user device, a touch pressure applied by the user, a fingerprint of the user.

Optionally, the step of analysing the user-interaction data and the sensor data to detect whether or not the user is a bot comprises:
    calculating a reliability factor for the user based on said analysis of the user-interaction data and the sensor data; and
    detecting whether or not the user is a bot, based on the calculated reliability factor.

Moreover, the present description also relates to the computer program product for detecting and preventing fraudulent activities on the software application as described above. The various embodiments and variants disclosed above apply mutatis mutandis to the aforesaid computer program product. The computer program product may be implemented as a Software Development Kit (SDK) that can be installed on the processing device. Optionally, in this regard, the SDK is implemented as a part of the software application.

Optionally, the at least one action comprises at least one of: notifying an application vendor of the software application, disabling the software application on the user device, partially disabling the software application on the user device, interrupting the execution of the software application on the user device, removing the software application from the user device, isolating a user account of the user from user accounts of other users, blacklisting the user account, blacklisting the user device, recording a fraudulent activity conducted by the bot, recording information pertaining to the bot, recording information pertaining to a session of the software application in which a fraudulent activity is detected, deferring a transfer of credits made from or to the user account during the session of the software application, adjusting settings related to billing, disabling advertisements on the software application.

Optionally, the program instructions of the computer program product cause the processing device to:
    receive at least one data element from the server arrangement;
    render the at least one data element during the execution of the software application; and
    generate the user-interaction data based on a response of the user to the at least one data element.

Optionally, the user-interaction data is indicative of at least one of: a time elapsed between a time instant at which the at least one data element is rendered at the processing device and a time instant at which the user provided the response, a time duration in which the response is provided, a velocity and/or acceleration with which the user moves a pointer on a display of the processing device, a movement pattern of the pointer, a click pattern of the pointer, a pause pattern of the pointer, a number of pointer clicks made by the user to provide the response, areas on the display where the user made the pointer clicks, a key-press pattern of one or more keys of an input device associated with the processing device, a latency between pressing a given key and pressing a next key, a latency between releasing the given key and releasing the next key, a latency between releasing the given key and pressing the next key, a time duration in which pressure is applied on a given key.

Optionally, the at least one sensor comprises at least one of: an accelerometer, a gyroscope, an imaging sensor, a location sensor, a temperature sensor, a proximity sensor, a touch-pressure sensor, a fingerprint sensor. Optionally, the sensor data is indicative of at least one of: an acceleration of the processing device, an orientation of the processing device, an image of the user, an image of surroundings of the processing device, a location of the processing device, an ambient temperature in surroundings of the processing device, a proximity of the user to the processing device, a touch pressure applied by the user, a fingerprint of the user.

Detailed Description of the Drawings

Referring to FIG. 1, there is shown a network environment in which a system 100 for detecting and preventing fraudulent activities on a software application can be implemented, pursuant to embodiments of the present disclosure. As shown, the network environment comprises a plurality of user devices, shown as user devices 102 and 104 having sensors 106 and 108, respectively. The system 100 comprises a server arrangement 110 communicably coupled with the user devices 102 and 104. The server arrangement 110 is configured to receive user-interaction data and sensor data from the user devices 102 and 104, analyse the user-interaction data and the sensor data to detect whether or not a corresponding user of a given user device is a bot, and perform at least one action when the given user is detected to be a bot.

Figure 2:
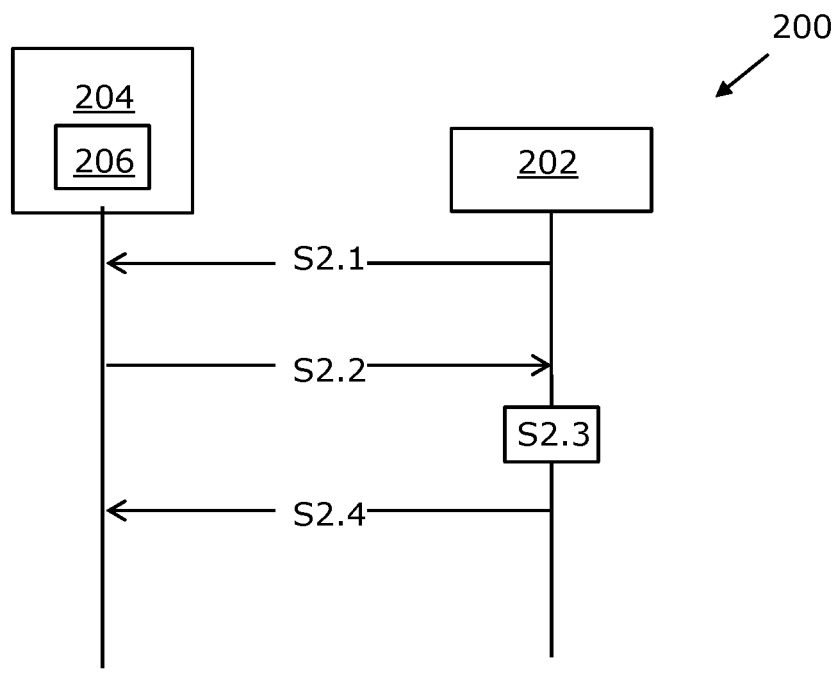
FIG. 2 is an exemplary sequence diagram of implementation of the aforesaid system, in accordance with an embodiment of the present disclosure.

Referring to FIG. 2, illustrated is a schematic exemplary sequence diagram of implementation of a system 200 for detecting and preventing fraudulent activities on a software application, in accordance with an embodiment of the present disclosure. At a step S2.1, a server arrangement 202 transmits a data element to a user device 204 comprising at least one sensor 206. At a step S2.2, the server arrangement 202 receives user-interaction data and sensor data from the user device 204. At a step S2.3, the server arrangement 202 analyses the user-interaction data and the sensor data to detect whether or not the user is a bot. At a step S2.4, the server arrangement 202 performs at least one action when the user is a bot.

Figure 3:
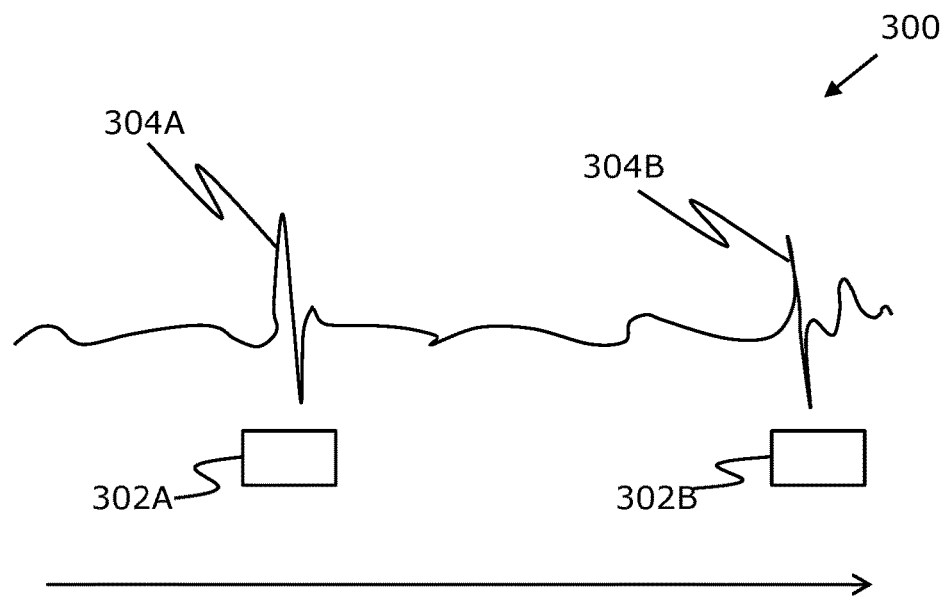
FIG. 3 is a graphical representation of user-interaction data and sensor data, in accordance with an embodiment of the present disclosure.

Referring to FIG. 3, illustrated is a graphical representation of user-interaction data 302A and 302B and sensor data 304A and 304B, in accordance with an embodiment of the present disclosure. The user-interaction data 302A and 302B and the sensor data 304A and 304B are graphically represented with respect to time. The user-interaction data 302A and 302B and the sensor data 304A and 304B may be time-stamped. As shown, the sensor data 304A and the user-interaction data 302A are occurring generally at a same time, and the sensor data 304B and the user-interaction data 302B are occurring generally at a same time.

Figure 4:
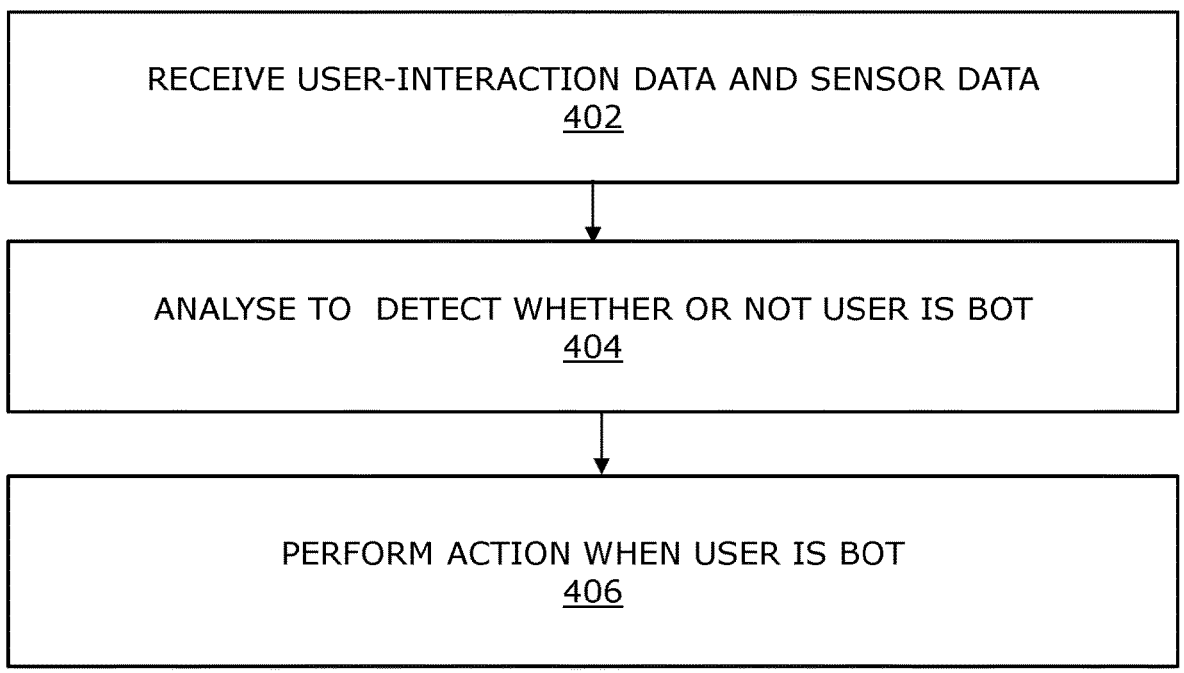
FIG. 4 is an illustration of a flowchart listing steps of a method for detecting and preventing fraudulent activities on the software application, in accordance with an embodiment of the present disclosure.

Referring to FIG. 4, illustrated are steps of a method for detecting and preventing fraudulent activities on a software application, in accordance with an embodiment of the present disclosure. At a step 402, user-interaction data and sensor data are received from a user device on which the software application is being executed. Herein, the user-interaction data is indicative of an interaction of a user with the software application. The sensor data is collected by at least one sensor of the user device during execution of the software application. At a step 404, the user-interaction data and the sensor data are analysed to detect whether or not the user is a bot. At a step 406, at least one action is performed when the user is a bot.

The steps 402 to 406 are only illustrative and other alternatives can also be provided where one or more steps are added, one or more steps are removed, or one or more steps are provided in a different sequence without departing from the scope of the claims herein.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. A system for detecting and preventing fraudulent activities on a software application, the system comprising a server arrangement that is communicably coupled with a user device, wherein the server arrangement is configured to:
enable execution of the software application by the user device;
send a data element of the software application to the user device during execution of the software application on the user device;
receive user-interaction data from the user device responsive to the rendering of the data element at the user device, the user-interaction data including pointer clicks or key presses being generated by a response to the data element being rendered at the user device responsive to the rendering of the data element,
receive sensor data from the user device on which the software application is being executed, the sensor data being collected by at least one sensor of the user device during the generation of the user-interaction data, wherein the at least one sensor comprises an accelerometer configured to detect movement of the user device during the user interaction, a gyroscope configured to detect an orientation of the user device during the user interaction and a location sensor configured to detect a location of the user device during the interaction and the sensor data comprises movement data, orientation data and location data of the user device during the generation of the user-interaction data;
analyse a number of pointer clicks or key presses, the user-interaction data, the sensor data and the location data to detect whether or not a user of the user device is a bot, wherein the server arrangement is configured to confirm physical actions associated with the user-interaction data to determine whether or not the user of the user device is a bot; wherein the server arrangement is further configured to:
compare location information from the location sensor to a determined location of an IP address currently associated with the user device to confirm that the user device is executing the software application; and
perform at least one action when the analysis indicates that the user of the user device is a bot or the comparison of the location information from the location sensor to the determined location of the user device indicates that the user device is not executing the software application.

2. The system of claim 1, wherein the at least one action comprises at least one of:
notifying an application vendor of the software application, disabling the software application on the user device, partially disabling the software application on the user device, interrupting the execution of the software application on the user device, removing the software application from the user device, isolating a user account of the user from user accounts of other users, blacklisting the user account, blacklisting the user device, recording a fraudulent activity conducted by the bot, recording information pertaining to the bot, recording information pertaining to a session of the software application in which a fraudulent activity is detected, deferring a transfer of credits made from or to the user account during the session of the software application, adjusting settings related to billing, disabling advertisements on the software application.

3. The system of claim 1, wherein the server arrangement is configured to:
receive the user-interaction data and the sensor data at corresponding respective points of time from a plurality of user devices on which the software application is being executed,;
analyse the user-interaction data and the sensor data received from the plurality of user devices to determine a pattern of usage of the software application; and
train a machine learning model based on the determined pattern of usage of the software application, wherein the trained machine learning model is to be employed to analyse the user-interaction data and the sensor data received from the user device to detect whether or not the user is a bot.

4. The system of claim 1, wherein the user-interaction data is indicative of at least one of:
a time elapsed between a time instant at which the data element is rendered at the user device and a time instant at which the user-interaction data was provided,
a time duration in which the user-interaction data is provided, a velocity and/or acceleration with which the user moves a pointer on a display of the user device,
a movement pattern of the pointer,
a click pattern of the pointer,
a pause pattern of the pointer,
a number of pointer clicks made to provide the user-interaction data,
areas on the display where the pointer clicks were made,
a key-press pattern of one or more keys of an input device associated with the user device,
a latency between pressing a given key and pressing a next key,
a latency between releasing the given key and releasing the next key,
a latency between releasing the given key and pressing the next key,
a time duration in which pressure is applied on a given key.

5. The system of claim 1, wherein the at least one sensor further comprises at least one of: an imaging sensor, a temperature sensor, a proximity sensor, a touch-pressure sensor, a fingerprint sensor.

6. The system of claim 1, wherein the sensor data is further indicative of at least one of: an image of the user, an image of surroundings of the user device, an ambient temperature in surroundings of the user device, a proximity of the user to the user device, a touch pressure applied by the user, a fingerprint of the user.

7. The system of claim 1, wherein, when analysing the user-interaction data and the sensor data to detect whether or not the user is a bot, the server arrangement is configured to:
calculate a reliability factor for the user based on said analysis of the user-interaction data and the sensor data; and
detect whether or not the user is a bot, based on the calculated reliability factor.

8. The system according to claim 1, wherein the server arrangement is further configured to detect from the user interaction data a movement pattern of the pointer, a click pattern of the pointer, a pause pattern of the pointer, a number of pointer clicks made to provide the user-interaction data, and areas on the display where the pointer clicks were made to provide the user-interaction data.

9. A method for detecting and preventing fraudulent activities on a software application, the method comprising:
enable execution of the software application by a user device;
send a data element of the software application to the user device during execution of the software application on the user device;
receiving user-interaction data from the user device responsive to a rendering of the data element at the user device, the user-interaction data including a number of pointer clicks or key presses being generated by a response to the data element being rendered at the user device at a first time during the execution of the software application;
receive sensor data from the user device on which the software application is being executed, the sensor data being collected by at least one sensor of the user device during the generation of the response to the data element by the user device at the first time during execution of the software application, wherein the at least one sensor comprises an accelerometer configured to detect movement of the user device, a gyroscope configured to detect an orientation of the user device at different points in time, and location data of the user device during the generation of the user-interaction data, and wherein the sensor data comprises movement data of the user device, orientation data of the user device and the location of the user device during generation of the user-interaction data responsive to the data element;
analysing the user-interaction data and the sensor data to detect whether or not a user of the user device is a bot, wherein the server arrangement is configured to confirm physical actions associated with the response to the data element from the sensor data to determine whether or not the user of the user device is a bot; and wherein the method further comprises:
comparing location information from the location sensor to a determined location of an IP address currently associated with the user device to confirm that the user device is executing the software application; and
performing at least one action when the analyzing determines that the user is a bot or the comparing of the location information from the location sensor to the determined location of the user device indicates that the user device is not executing the software application.

10. The method of claim 9, wherein the at least one action comprises at least one of: notifying an application vendor of the software application, disabling the software application on the user device, partially disabling the software application on the user device, interrupting the execution of the software application on the user device, removing the software application from the user device, isolating a user account of the user from user accounts of other users, blacklisting the user account, blacklisting the user device, recording a fraudulent activity conducted by the bot, recording information pertaining to the bot, recording information pertaining to a session of the software application in which a fraudulent activity is detected, deferring a transfer of credits made from or to the user account during the session of the software application, adjusting settings related to billing, disabling advertisements on the software application.

11. The method of claim 9, further comprising:
receiving user-interaction data and sensor data at corresponding respective points of time from a plurality of user devices on which the software application is being executed;
analysing the user-interaction data and the sensor data received from the plurality of user devices to determine a pattern of usage of the software application; and
training a machine learning model based on the determined pattern of usage of the software application, wherein the trained machine learning model is employed to analyse the user-interaction data and the sensor data received from the user device to detect whether or not the user is a bot.

12. The method of claim 11, wherein the user-interaction data is indicative of at least one of:
a time elapsed between a time instant at which the data element is rendered at the user device and a time instant at which the response was provided,
a time duration in which the response is provided,
a velocity and/or acceleration with which a pointer is moved on a display of the user device,
a movement pattern of the pointer,
a click pattern of the pointer,
a pause pattern of the pointer, a number of pointer clicks made by the pointer to provide the response, areas on the display where the pointer clicks were made, a key-press pattern of one or more keys of an input device associated with the user device, a latency between pressing a given key and pressing a next key, a latency between releasing the given key and releasing the next key, a latency between releasing the given key and pressing the next key, a time duration in which pressure is applied on a given key.

13. The method of claim 9, wherein the at least one sensor further comprises at least one of: a gyroscope, an imaging sensor, a temperature sensor, a proximity sensor, a touch-pressure sensor, a fingerprint sensor.

14. The method of claim 9, wherein the sensor data is further indicative of at least one of: an image of the user, an image of surroundings of the user device, an ambient temperature in surroundings of the user device, a proximity of the user to the user device, a touch pressure applied by the user, a fingerprint of the user.

15. The method of claim 9, wherein the step of analysing the user-interaction data and the sensor data to detect whether or not the user is a bot comprises:

calculating a reliability factor for the user based on said analysis of the user-interaction data and the sensor data; and detecting whether or not the user is a bot, based on the calculated reliability factor.

16. The method according to claim 9, wherein the method further comprises detecting from the user interaction data a movement pattern of the pointer made to provide the user-interaction data, a click pattern of the pointer made to provide the user-interaction data, a pause pattern of the pointer made to provide the user-interaction data, a number of pointer clicks made to provide the user-interaction data, and areas on the display where the pointer clicks were made to provide the user-interaction data.

17. A computer program product for detecting and preventing fraudulent activities on a software application, the computer program product comprising a non-transitory machine-readable data storage medium having stored thereon program instructions that, when executed by a processing device, cause the processing device to:

enable execution of the software application by a user device;

send a data element of the software application to the user device during execution of the software application on the user device;

collect user-interaction data from the user device responsive to a rendering of the data element at the user device, the user-interaction data being generated by a response to the data element at the user device at a first time during the execution of the software application;

collect sensor data generated by at least one sensor of the user device during generation of the response to the data element by the user devices at the first time while the software application is being executed, wherein the at least one sensor comprises an accelerometer configured to detect movement of the user device, a gyroscope configured to detect an orientation of the user device at different points in time, and a location sensor configured to detect a location of the user device, wherein the sensor data comprises movement data of the user device, orientation data and location data of the user device during the response to the data element;

send the user-interaction data and the sensor data to a server arrangement, wherein the server arrangement is configured to analyse the user-interaction data and the sensor data to detect whether or not a user of the user device is a bot, wherein the server arrangement is configured to confirm physical actions associated with the response to the data element from the sensor data to determine whether or not the user of the user device is a bot;

compare location information from the location sensor to a determined location of an IP address currently associated with the user device to confirm that the user device is executing the software application;

receive an indication from the server arrangement when the user is a bot or the comparison of the location information from the location sensor to the determined location of the user device indicates that the user device is not executing the software application; and perform at least one action upon receiving the indication.

18. The computer program product of claim 17, wherein the at least one action comprises at least one of: notifying an application vendor of the software application, disabling the software application on the user device, partially disabling the software application on the user device, interrupting the execution of the software application on the user device, removing the software application from the user device, isolating a user account of the user from user accounts of other users, blacklisting the user account, blacklisting the user device, recording a fraudulent activity conducted by the bot, recording information pertaining to the bot, recording information pertaining to a session of the software application in which a fraudulent activity is detected, deferring a transfer of credits made from or to the user account during the session of the software application, adjusting settings related to billing, disabling advertisements on the software application.

19. The computer program product of claim 17, wherein the user-interaction data is indicative of at least one of:

a time elapsed between a time instant at which the data element is rendered and a time instant at which the user provided the response, a time duration in which the response is provided, a velocity and/or acceleration with which a pointer is moved on a display of the user device, a movement pattern of the pointer, a click pattern of the pointer, a pause pattern of the pointer, a number of pointer clicks made by the user to provide the response, areas on the display where the user made the pointer clicks, a key-press pattern of one or more keys of an input device associated with the processing device, a latency between pressing a given key and pressing a next key, a latency between releasing the given key and releasing the next key, a latency between releasing the given key and pressing the next key, a time duration in which pressure is applied on a given key.

20. The computer program product of claim 17, wherein the at least one sensor further comprises at least one of: an imaging sensor, a temperature sensor, a proximity sensor, a touch-pressure sensor, a fingerprint sensor.

21. The computer program product of claim 17, wherein the sensor data is further indicative of at least one of: an image of the user, an image of surroundings of the processing device, a location of the processing device, an ambient temperature in surroundings of the processing device, a proximity of the user to the processing device, a touch pressure applied by the user, a fingerprint of the user.

* * * * *